June 30, 1925.
O. A. POIRIER
EXPECTORATING DEVICE FOR VEHICLES
Filed Jan. 2, 1925
1,543,868
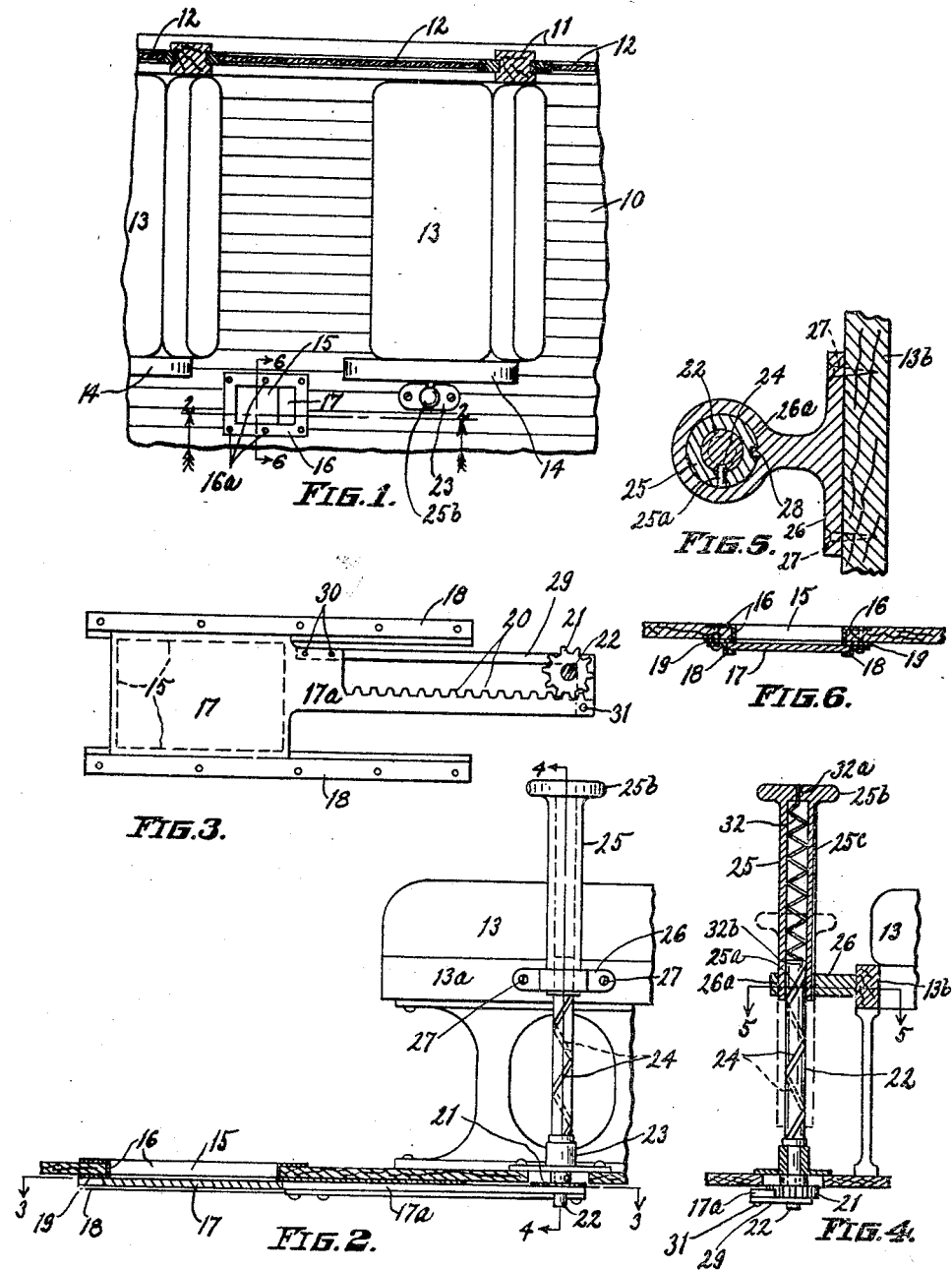
INVENTOR:
Octave A. Poirier
BY David E. Carlsen.
ATTORNEY.

Patented June 30, 1925.

1,543,868

UNITED STATES PATENT OFFICE.

OCTAVE A. POIRIER, OF GLADSTONE, MINNESOTA.

EXPECTORATING DEVICE FOR VEHICLES.

Application filed January 2, 1925. Serial No. 290.

*To all whom it may concern:*

Be it known that I, OCTAVE A. POIRIER, a citizen of the United States, residing at Gladstone, in the county of Ramsey and State of Minnesota, have invented certain new and useful Improvements in Expectorating Devices for Vehicles, of which the following is a specification.

My invention relates to sanitary appliances for passenger carrying vehicles in general and the main object is to provide the floors of such vehicles with apertures adjacent the seats and through which the occupants of the vehicle may expectorate or throw away fruit rinds, peelings, cigar stumps, peanut shells etc., out of the vehicle. A further object is to provide each such aperture with a slide normally closing same but readily moved to provide an opening.

It is obvious that the device will dispense with the objectionable use of cuspidors or the equally objectionable conditions making it necessary to open vehicle windows to throw out any waste matter. The latter condition is of course particularly aggravated in wintry or rainy weather when the vehicle windows are usually closed.

I have illustrated my device in its simplest and most effective form and mainly in unobstructive position under the floor of a railway vehicle and the manipulated parts adjacent a seat of the vehicle.

In the accompanying drawing,—

Fig. 1 is a floor plan or top view of a portion of a railway coach and one of my devices installed near one of its seats.

Fig. 2 is an enlarged sectional elevation about as on line 2—2 in Fig. 1.

Fig. 3 is a top view of my device with the rotating rod 22 cut off about as on line 3—3 in Fig. 2.

Fig. 4 is a vertical sectional view about as on line 4—4 in Fig. 2.

Fig. 5 is an enlarged sectional view on line 5—5 in Fig. 4.

Fig. 6 is an enlarged sectional view of the shutter plate and adjacent parts as on line 6—6 in Fig. 1.

Referring to the drawing by reference numerals, Fig. 1 shows a portion of a passenger carrying vehicle in which 10 is the floor, 11 a side wall with windows 12, seats 13 fixed near said windows and having each the usual arm rest 14. 15 is a preferably rectangular opening in the floor and 16 is a metal guard about said opening and secured to the floor with screws 16$^a$. Said guard may be set flush with the top of the floor as shown in Fig. 6.

17 is a quadrangular plate arranged to normally close the floor opening and slidable in a track formed by two parallel channels 18 of the so-called Z-bar type, one channel at each side of the opening on the under side of the vehicle floor and longitudinally of the vehicle. 19, in Figs. 2 and 6, is a metal plate which may be secured between the floor and said channels to contact with plate 17 and enabling the latter to be more easily moved in its tracks. 17$^a$ is a longitudinal integral extension of plate 17 and has a toothed rack 20 the pitch line of which is preferably on the extended longitudinal center line of plate 17 (see Fig. 3).

When plate 17 is in position closing the aperture 15 the outer teeth of rack 20 are engaged by a pinion 21 fixed on a vertical shaft 22 journaled in a bearing plate 23 secured on the floor 10 adjacent one of the car seats 13. The major part of shaft 22, above bearing 23, is of enlarged diameter and provided with a helical or spiral groove 24 in its outer surface. This groove is engaged by a radial fixed pin 25$^a$ (see Figs. 4 and 5) in the lower end of a tubular member 25 terminating in an enlarged head 25$^b$ which is normally in accessible location at the side of the car seat. The member 25 is slidable vertically in the bore 26$^a$ of a bracket 26 fixed as at 27 to a convenient stationary element such as the seat frame 13$^b$ of the seat 13. The member 25 has a longitudinal external keyway 25$^c$ (see Figs. 4 and 5) slidably engaged by a fixed key 28 (Fig. 5) in the bore of the bracket 26 to prevent rotation of member 25.

29 is an L-shaped guide and stop member secured to the under side of the plate extension 17$^a$, as at 30 near the plate and 31 at the rear end of the rack. The long arm of this member is parallel to the rack and the short arm serves as a stop against shaft 22 when plate 17 is in a position closing the aperture 15 (see Fig. 3).

In the operation of the device the occupant of the seat merely presses down on the head 25$^b$ of the push member 25 and the pin 25$^a$ in the latter moving downwardly also and engaging the spiral groove 24 of shaft 22 causing the latter and its pinion 21 to rotate. The pinion being in mesh with the rack 20 will cause plate 17 to be moved away from the opening 15 and through which occupants of the vehicle may expectorate or throw any waste matter out of the vehicle.

32 (Fig. 4) is a compression coil spring inserted in the bore of the tubular push member 25, one end of the spring being secured as at $32^a$ in the head $25^b$ and the other end fixed as at $32^b$ in the upper end of shaft 22. Thus when the operator presses the push member down the spring is compressed into the decreasing space between head $25^b$ and the upper end of shaft 22. This action rotates the shaft 22, as previously described, and said rotating action also twists the coils of the spring. It will be readily understood that said spring will immediately push the member 25 up to its initial position and the pinion 21 will rotate and thereby push the plate 17 back to its original position.

What I claim is:

1. A device for the disposing of waste matter in vehicles comprising a vehicle floor having an opening, a plate slidably mounted in guides fixed adjacent said opening and normally closing it, an integral extension of said plate and a toothed rack on said extension, a pinion fixed on a vertical shaft and in mesh with said rack, means slidable on said vertical shaft and adapted to rotate it and the pinion to move the plate away from the opening in the floor and means for returning the plate to its closing position.

2. The structure specified in claim 1, in which said vertical shaft is provided with a spiral groove and said vertically arranged slidable means for rotating the vertical shaft consists of a tubular element, a fixed pin projecting radially into the bore of said tube and adapted to engage in the spiral groove of the shaft and means for holding said tube in non-rotatable position.

3. The structure specified in claim 1 in which said means for returning the plate to closed position of the floor opening comprises a coil spring within the tubular member, one end of said coil spring fixed in the upper end of the tubular member and its other end fixed in the upper end of the vertical shaft.

4. The structure specified in claim 1 in which said means for returning the plate to closed position comprises a coil spring within the tubular member, one end of said coil spring fixed in the upper end of the tubular member and its other end fixed in the upper end of the vertical shaft, said means for holding the tubular member in non-rotating position comprising a bracket secured on a fixed element in the vehicle and having a vertical bore slidably engaged by said tubular member, said latter member having a longitudinal keyway, a key fixed in the bore of said bracket and adapted to engage in said keyway.

In testimony whereof I affix my signature.

OCTAVE A. POIRIER.